(12) United States Patent
Hara et al.

(10) Patent No.: US 6,430,356 B1
(45) Date of Patent: Aug. 6, 2002

(54) INFORMATION RECORDING AND REPRODUCING APPARATUS FOR DUBBING AN AUDIO-VISUAL DIGITAL SIGNAL AND AUXILIARY INFORMATION RECORDED IN A MAGNETIC TAPE

(75) Inventors: Mitsuhiko Hara, Yokohama; Takeshi Okauchi, Chigasaki, both of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/105,034

(22) Filed: Jun. 26, 1998

(30) Foreign Application Priority Data

Jun. 27, 1997 (JP) .............................. 9-171749
Nov. 12, 1997 (JP) .............................. 9-310089

(51) Int. Cl.⁷ ......................... G11B 27/00; G11B 5/86; H04N 5/93
(52) U.S. Cl. ..................... 386/54; 386/463; 360/15
(58) Field of Search .......................... 386/54, 52, 94, 386/95, 46, 55, 4, 1, 39; 360/15, 13, 60; G11B 27/00, 5/86; H04N 5/93

(56) References Cited

U.S. PATENT DOCUMENTS 5,907,443 A * 5/1999 Hirata
5,982,977 A * 11/1999 Naruse et al.

* cited by examiner

Primary Examiner—Robert Chevalier
(74) Attorney, Agent, or Firm—Connolly Bove Lodge & Hutz LLP (57) ABSTRACT

An analog control signal with an index signal recorded in a first magnetic tape is reproduced in synchronization with the reproduction of an AV digital signal recorded in the first magnetic tape. The index signal corresponds to a leading position of the AV digital signal. When the index signal is detected, an index code is prepared, and the index code and the AV digital signal are packed in an isochronous packet. The index code corresponds to the leading position of the AV digital signal. The isochronous packet is transmitted to a recording VCR through a packet transmission line, and the AV digital signal extracted from the packet is recorded in a second magnetic tape. Also, when the index code of the packet is detected, a duty ratio of a specific group of pulses of a control signal generated in the recording VCR is changed to reproduce the index signal. Thereafter, the control signal with the index signal is recorded in the second magnetic tape while making the index signal correspond to the leading position of the AV digital signal. Therefore, even though any private line for an analog signal such as the control signal is not arranged, the control signal and the AV digital signal recorded in the first magnetic tape can be dubbed in the second magnetic tape.

10 Claims, 5 Drawing Sheets

INFORMATION RECORDING AND REPRODUCING APPARATUS FOR DUBBING AN AUDIO-VISUAL DIGITAL SIGNAL AND AUXILIARY INFORMATION RECORDED IN A MAGNETIC TAPE

BACKGROUND OF THE INVENTION

1. Field of the Invention

The present invention relates generally to an information recording and reproducing apparatus such as a video cassette tape recorder of a helical scan type, and more particularly to an information recording and reproducing apparatus in which an audio-visual digital signal and auxiliary information read out from a first recording medium is reproduced and the reproduced audio-visual digital signal and auxiliary information are recorded in a second recording medium for the dubbing of the audio-visual digital signal and auxiliary information.

2. Description of the Related Art

A video cassette tape recorder (VCR) of a helical scan type is conventionally known as a magnetic recording and reproducing apparatus. In this VCR, a visual signal and an audio signal are converted into an audio visual (AV) digital signal in which the visual signal and the audio signal are coded according to a moving picture experts group (MPEG), the AV digital signal is recorded in a cassette type magnetic tape through a rotational head while making a recording track inclined with respect to a moving direction (or a longitudinal direction) of the magnetic tape, and a control signal having a plurality of control pulses arranged in equal intervals is recorded in the magnetic tape through a fixed control head while making a control track extending along the moving direction of the magnetic tape. When the AV digital signal and the control signal are reproduced, the AV digital signal is readout from the inclined recording track of the magnetic tape through the rotational head, and the control signal is read out from the control track of the magnetic tape through the control head.

2.1. First Previously Proposed Art

In this VCR, the AV digital signal are recorded and reproduced by operating a known analog circuit. In this case, to record information indicating the leading position of the recorded AV digital signal, a duty ratio of a particular group of control pulses recorded in a particular position corresponding to the leading position of the recorded AV digital signal is changed from a first duty ratio to a second duty ratio. Therefore, when the particular group of control pulses recorded in the particular position at the second duty ratio is detected in the reproducing unit, the leading position of the recorded AV digital signal can be recognized, so that the AV digital signal can be immediately reproduced from its leading position.

2.2. Problems of First Previously Proposed Art to Be Solved by the Invention

However, when a digital signal recorded in a magnetic tape is reproduced in a reproducing VCR functioning as a reproducing unit and the reproduced digital signal is dubbed and recorded in another magnetic tape in a slave VCR functioning as a recording unit, because each of the VCRs has no digital interface, a particular group of control pulses (hereinafter, called an index signal) recorded in a control track at the second duty ratio cannot be transmitted to the slave VCR because the control pulses are an analog signal, or a private connection line for the transmission of the analog index signal is additionally required in addition to a main digital signal line for the AV digital signal. Therefore, in cases where the index signal cannot be transmitted to the slave VCR, the index signal cannot be recorded in the slave VCR. Also, in cases where the private connection line is additionally used, a connector is required for each VCR. As a result, a cost for manufacturing an information recording and reproducing apparatus composed of the reproducing VCR, the slave VCR and the main digital signal line is increased.

2.3. Second Previously Proposed Art

Figure 1:
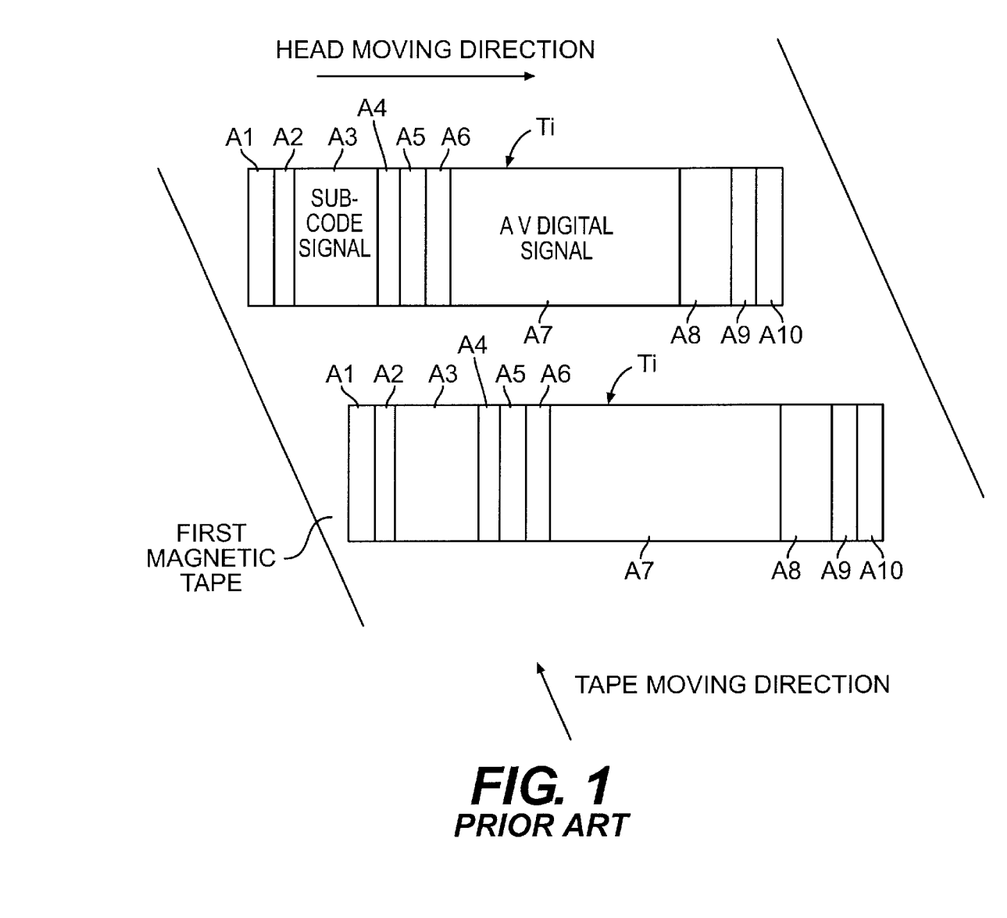
FIG. 1 shows a format of one recording track in which a sub-code signal area for recording a sub-code signal and a main data area for recording an AV digital signal are arranged.

Also, an information recording and reproducing apparatus, in which a digital VCR for recording and reproducing a digital signal is arranged as a reproducing unit, an analog VCR with a digital interface for recording and reproducing an analog signal is arranged as a recording unit and a cable connecting the digital VCR and the analog VCR is arranged, is known. In this information recording and reproducing apparatus, an AV digital signal recorded in a first magnetic tape is reproduced in the digital VCR, the reproduced AV digital signal is transmitted to the analog VCR through the cable and the digital interface of the analog VCR, and the reproduced AV digital signal is recorded in a second magnetic tape by the analog VCR. In this case, the AV digital signal of the first magnetic tape is recorded in each of a plurality of recording tracks which are arranged in parallel to each other and are inclined with respect to a tape moving direction (or a longitudinal direction) of the first magnetic tape. As shown in FIG. 1, a format of each inclined track Ti is composed of a margin area A1, a first preamble area A2, a sub-code area A3 for recording a sub-code signal, a first post-amble area A4, an inter-block gap (IBG) area A5, a second preamble area A6, a main data area A7 for recording the AV digital signal, an error correcting code area A8, a second post-amble area A9, and a margin area A10, and each inclined track is composed of 356 synchronous blocks. The main data area A7 is composed of 306 synchronous blocks. Each synchronous block is composed of a synchronous signal area of 2 bytes for the reproduction of the synchronous block, an address information area of 3 bytes, a header storing area of 3 bytes for recording various information, a data recording area of 96 bytes, and a parity area of 8 bytes for the error correction of the information of the synchronous block. The areas of each synchronous block are arranged in time-sequence, and each synchronous block is 112 bytes.

Therefore, when the digital VCR is operated, not only the AV digital signal recorded in the area A7 is reproduced but also the sub-code signal recorded in the area A3 is reproduced.

The sub-code signal indicates information data relating to the AV digital signal. For example, tape recording elapsed time data, recording date data, a program number corresponding to the AV digital signal and time data of a leading position (or a starting position) of the AV digital signal are included in the sub-code signal. Therefore, a change of information indicated by the sub-code signal is synchronized with the leading position of the AV digital signal.

2.4. Problems of Second Previously Proposed Art to Be Solved by the Invention

However, even though the AV digital signal and the sub-code signal reproduced in the digital VCR are received in the analog VCR through the digital interface of the analog VCR, because any recording unit for recording the sub-code signal is not arranged in the analog VCR, the AV digital signal and the sub-code signal recorded in the first magnetic tape cannot be dubbed in the second magnetic tape.

Also, in cases where any detecting unit for detecting the sub-code signal is not arranged in the analog VCR, even though a control signal generated in the analog VCR is recorded in the second magnetic tape, information indicated by the subcode signal cannot be transferred to the control signal. Therefore, it is difficult to immediately detect the leading position of the AV digital signal reproduced from the dubbed magnetic tape.

SUMMARY OF THE INVENTION

A first object of the present invention is to provide, with due consideration to the drawbacks of such a conventional information recording and reproducing apparatus, an information recording and reproducing apparatus in which a digital signal such as a digital AV signal and an analog identification signal such as an analog index signal recorded in a recording medium are recorded in another recording medium without using any private transmission line for the analog identification signal.

A second object of the present invention is to provide an information recording and reproducing apparatus and an information recording and reproducing method in which information of a sub-code signal recorded in a first recording medium with an AV digital signal are substantially recorded in a second recording medium even though the sub-code signal is not recorded in the second recording medium.

The first object is achieved by the provision of an information recording and reproducing apparatus, in which a main digital information signal recorded in a first track of a first recording medium and an auxiliary signal recorded in a second track of the first recording medium are reproduced in a reproducing apparatus and the main digital information signal and the auxiliary signal reproduced by the reproducing apparatus are dubbed and recorded in a second recording medium in a recording apparatus, the reproducing apparatus comprising:

a main information signal reproducing device for reproducing the main digital information signal recorded in the first track of the first recording medium;

an auxiliary signal reproducing device for reproducing the auxiliary signal recorded in the second track of the first recording medium in synchronization with the reproduction of the main digital information signal in the main information signal reproducing device, the auxiliary signal being composed of a plurality of pulses arranged in series, a particular group of pulses in the auxiliary signal being set to a special duty ratio, and the other pulses of the auxiliary signal being set to an ordinary duty ratio;

an identification signal detecting device for detecting the particular group of pulses as an analog identification signal from the auxiliary signal reproduced by the auxiliary signal reproducing device;

an identification code preparing device for preparing an identification code corresponding to the analog identification signal in cases where the analog identification signal is detected by the identification signal detecting device; and a packet preparing device for preparing a packet defined according to a prescribed serial interface to arrange the main digital information signal reproduced by the main information signal reproducing device and the identification code reproduced by the auxiliary signal reproducing device in the packet, and the recording apparatus comprising:

a packet detecting device for detecting the packet transmitted from the packet preparing device;

a main information signal detecting device for detecting the main digital information signal from the packet detected by the packet detecting device;

a main information signal recording device for recording the main digital information signal detected by the main information signal detecting device in a first track of the second recording medium;

an identification code detecting device for detecting the identification code from the packet detected by the packet detecting device;

an auxiliary signal generating device for generating a recording auxiliary signal composed of a plurality of recording pulses arranged in series, the recording pulses being set to a recording ordinary duty ratio;

a pulse duty ratio adjusting device for detecting a particular group of recording pulses, in synchronization with the detection of the identification code in the identification code detecting device, from the recording auxiliary signal generated by the auxiliary signal generating device, and adjusting the recording ordinary duty ratio of the particular group of recording pulses to a recording specific duty ratio; and an auxiliary signal recording device for recording the auxiliary signal, in which the particular group of recording pulses is set to the recording specific duty ratio by the pulse duty ratio adjusting device, in a second track of the second recording medium in synchronization with the recording of the main digital information signal in the main information signal recording device.

In the above configuration, the main digital information signal of the first recording medium is reproduced by the main information signal reproducing device. Also, the auxiliary signal of the first recording medium is reproduced by the auxiliary signal reproducing device in synchronization with the reproduction of the main digital information signal, and the particular group of pulses is detected from the auxiliary signal as an analog identification signal by the identification signal detecting device. The analog identification signal, for example, indicates a leading position of the main digital information signal.

Because the identification signal is analog and the main digital information signal is digital, the identification signal and the main digital information signal cannot be packed in the same packet defined according to a prescribed serial interface. Therefore, in cases where the analog identification signal is detected, an identification code corresponding to the analog identification signal is prepared by the identification code preparing device. Because the identification code is digital, the identification code and the main digital information signal are packed in the same packet defined according to a prescribed serial interface by the packet preparing device, and the packet is transmitted to the recording apparatus.

In the recording apparatus, the main digital information signal is detected from the packet by the main information signal detecting device, and the identification code is detected from the packet by the identification code detecting device. The main digital information signal is recorded in a first track of a second recording medium by the main information signal recording device. Also, a recording auxiliary signal, in which a series of recording pulses is set to a recording ordinary duty ratio, is generated by the auxiliary signal generating device, and a particular group of recording pulses is adjusted to a recording specific duty ratio by the pulse duty ratio adjusting device in synchronization with the detection of the identification code. Therefore, the recording auxiliary signal, which is the same as the auxiliary signal, is produced according to the identification code. The recording auxiliary signal is recorded in a second track of the second recording medium by the auxiliary signal recording device in synchronization with the recording of the main digital information signal.

Accordingly, because the main digital information signal and the recording auxiliary signal are recorded in the second recording medium in the same manner as the recording of the main digital information signal and the auxiliary signal in the first recording medium, even though the identification signal of the auxiliary signal is analog, the main digital information signal and the auxiliary signal can be substantially dubbed in the second recording medium through one transmission line without using any private transmission line for the analog identification signal.

The second object is achieved by the provision of an information recording and reproducing apparatus, comprising:

a main information signal reproducing device for reproducing a main digital information signal and a sub-code signal recorded in a first track of a first recording medium, preparing a packet defined according to a prescribed serial interface to arrange the main digital information signal and the sub-code signal in the packet, a change of information indicated by the sub-code signal corresponding to a change of information indicated by the main digital information signal;

a packet transmitting line for transmitting the packet in which the main digital information signal and the sub-code signal are arranged by the main information signal reproducing device;

a packet detecting device for detecting the packet transmitted from the main information signal reproducing device through the packet transmitting line;

a main information signal detecting device for detecting the main digital information signal from the packet detected by the packet detecting device;

a main information signal recording device for recording the main digital information signal detected by the main information signal detecting device in a first track of a second recording medium;

a sub-code signal detecting device for detecting the sub-code signal from the packet detected by the packet detecting device and detecting the change of the information indicated by the sub-code signal;

an auxiliary signal generating device for generating an auxiliary signal composed of a plurality of pulses arranged in series, the pulses being set to an ordinary duty ratio;

a pulse duty ratio adjusting device for detecting a particular group of pulses, which is synchronized with the change of the information of the sub-code signal detected by the sub-code signal detecting device, from the auxiliary signal generated by the auxiliary signal generating device, and adjusting the ordinary duty ratio of the particular group of pulses to a specific duty ratio; and an auxiliary signal recording device for recording the auxiliary signal, in which the particular group of pulses is set to the specific duty ratio by the pulse duty ratio adjusting device, in a second track of the second recording medium to make the particular group of pulses of the auxiliary signal correspond to the change of the information of the main digital information signal recorded in the first track of the second recording medium.

In the above configuration, a main digital information signal and a sub-code signal are recorded in a first track of a first recording medium, and a change of information indicated by the sub-code signal corresponding to a change of information indicated by the main digital information signal. The main digital information signal and the sub-code signal are reproduced by the main information signal reproducing device and are packed in a packet. The packet is transmitted to the packet detecting device through the packet transmitting line, and the packet is detected. Thereafter, the main digital information signal is detected from the packet by the main information signal detecting device and is recorded in a first track of a second recording medium by the main information signal recording device.

Also, the sub-code signal is detected from the packet by the sub-code signal detecting device, the change of the information indicated by the sub-code signal is detected, and a particular group of pulses synchronized with the change of the information of the sub-code signal is detected from an auxiliary signal generated by the auxiliary signal generating device. An ordinary duty ratio of the particular group of pulses of the auxiliary signal is adjusted to a specific duty ratio by the pulse duty ratio adjusting device, and the auxiliary signal is recorded in a second track of the second recording medium on condition that the particular group of pulses of the auxiliary signal corresponds to the change of the information of the main digital information signal recorded in the first track of the second recording medium.

Accordingly, though the sub-code signal is not recorded with the main digital information signal in the second recording medium, because the auxiliary signal having the information indicated by the sub-code signal is recorded in the second recording medium, information recorded in the first recording medium can be substantially dubbed in the second recording medium.

Also, because an analog circuit for generating an auxiliary signal composed of a plurality of pulses arranged in series, an analog circuit for adjusting a duty ratio of a particular group of pulses of the auxiliary signal and an analog circuit for recording the auxiliary signal in synchronization with the main digital information signal are conventionally used, the auxiliary signal generating device, the pulse duty ratio adjusting device and the auxiliary signal recording device can be easily prepared, so that the information recording and reproducing apparatus can be manufactured at a low cost.

Also, because an analog circuit for reading out an auxiliary signal from the first recording medium is not required, the main information signal reproducing device can be easily realized by using a conventional reproducing apparatus, so that the information recording and reproducing apparatus can be manufactured at a low cost.

Also, because the sub-code signal is not recorded in the second recording medium, any device for recording the sub-code signal is not required.

The second object is also achieved by the provision of an information recording and reproducing method, comprising the steps of:

reproducing a main digital information signal and a subcode signal recorded in a first track of a first recording medium, a change of information indicated by the sub-code signal indicating a change of information indicated by the main digital information signal;

preparing a packet defined according to a prescribed serial interface to arrange the main digital information signal and the sub-code signal in the packet;

transmitting the packet through a packet transmitting line;

detecting the packet transmitted through the packet transmitting line;

detecting the main digital information signal from the packet;

detecting the sub-code signal from the packet;

detecting the change of the information indicated by the sub-code signal;

preparing an analog identification signal when the change of the information indicated by the sub-code signal is detected;

recording the main digital information signal in a first track of a second recording medium; and recording the analog identification signal in a second track of the second recording medium to make the analog identification signal correspond to the change of information indicated by the main digital information signal.

In the above steps, because the analog identification signal is prepared when the change of the information indicated by the sub-code signal is detected, the analog identification signal is recorded in the second track of the second recording medium while the analog identification signal corresponds to the change of information indicated by the main digital information signal.

Accordingly, information recorded in the first recording medium can be substantially dubbed in the second recording medium.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of an information recording and reproducing apparatus according to the present invention are described with reference to the drawings.

(First Embodiment)

Figure 2:
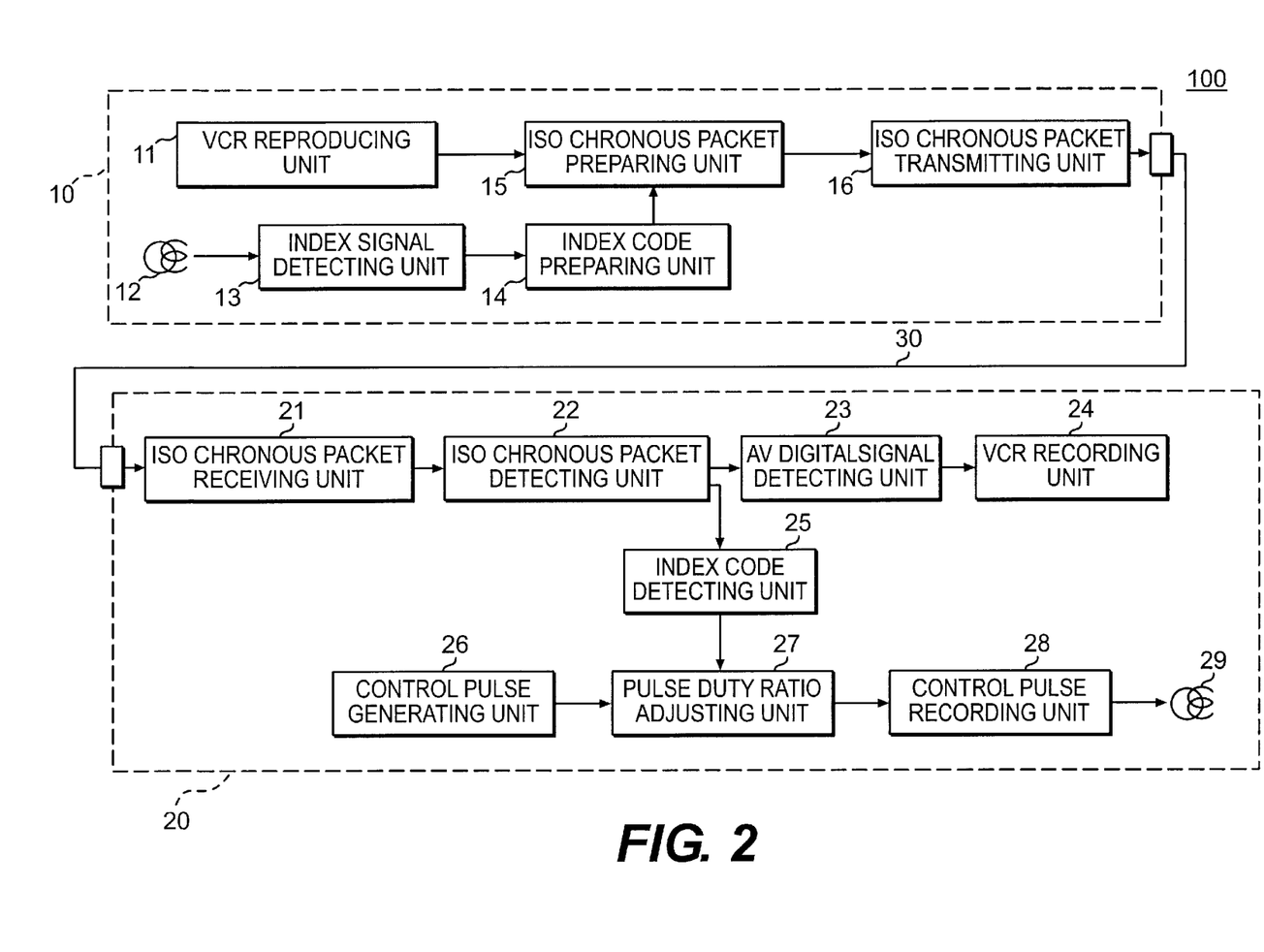
FIG. 2 is a block diagram of an information recording and reproducing apparatus according to a first embodiment of the present invention.

FIG. 2 is a block diagram of a information recording and reproducing apparatus according to a first embodiment of the present invention.

As shown in FIG. 2, an information recording and reproducing apparatus 100 comprises:

a reproducing VCR 10, functioning as a reproducing unit, for reproducing an AV digital signal (or a main information digital signal) recorded in a first magnetic tape, reproducing an analog auxiliary signal recorded in the first magnetic tape, detecting an analog identification signal from the analog auxiliary signal, preparing an identification code from the analog auxiliary signal, packing the AV digital signal and the identification code in an isochronous packet and outputting the isochronous packet, the AV digital signal being obtained from a visual signal and an audio signal, and the isochronous packet being defined according to IEEE 1394 standards of the Institute of Electrical and Electronics Engineers (IEEE) adopted as a serial interface having a real time transmission function;

a recording VCR 20, functioning as a recording unit, for recording the AV digital signal of the isochronous packet output from the reproducing VCR 10 in a second magnetic tape through a rotational head and recording the analog identification signal reproduced by using the identification code of the isochronous packet in the second magnetic tape through a fixed head; and a cable 30, having a real time transmission function according to the IEEE 1394 standards, for transmitting the isochronous packet output from the reproducing VCR 10 to the recording VCR 20.

The reproducing VCR 10 comprises:

a VCR reproducing unit 11 for reproducing the AV digital signal recorded in an inclined recording track of the first magnetic tape through a rotational head (not shown) and processing the AV digital signal according to a conventional signal processing;

a control head 12 for reading out digital control data recorded in a control track of the first magnetic tape and reproducing an analog control signal from the digital control data, the analog control signal representing the analog auxiliary signal being composed of a plurality of control pulses arranged in equal intervals, a particular group of control pulses recorded in correspondence to the leading position of the recorded AV digital signal being set to a second duty ratio (or a specific duty ratio), and the other control pulses being set to a first duty ratio (or ordinary duty ratio);

an index signal detecting unit 13 for checking a duty ratio of the control pulses of the analog control signal and outputting an index signal detecting signal when the particular group of control pulses set to the second duty ratio is detected from the analog control signal as an index signal representing the identification signal;

an index code preparing unit 14 for preparing an index code representing the identification code when the index signal detecting signal output from the index signal detecting unit 13 is received;

an isochronous packet preparing unit 15 for preparing an isochronous packet defined according to the IEEE 1394 standards, inserting the AV digital signal processed in the VCR reproducing unit 11 into a data payload portion of the isochronous packet and inserting the index code received from the index code preparing unit 14 into a predetermined position of the data payload portion of the isochronous packet; and an isochronous packet transmitting unit 16 for performing a parallel-serial conversion for the isochronous packets received one after another from the isochronous packet preparing unit 15 to arrange the isochronous packets in a format according to the IEEE 1394 standards and transmitting the isochronous packets to the cable 30.

Figure 3A:
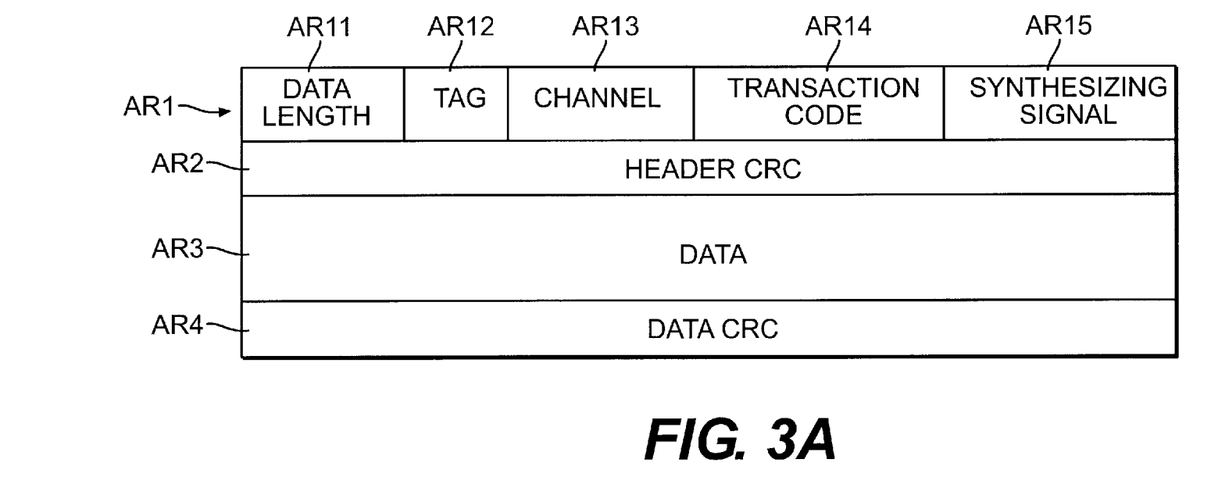
FIG. 3A shows the configuration of an isochronous packet.
Figure 3B:
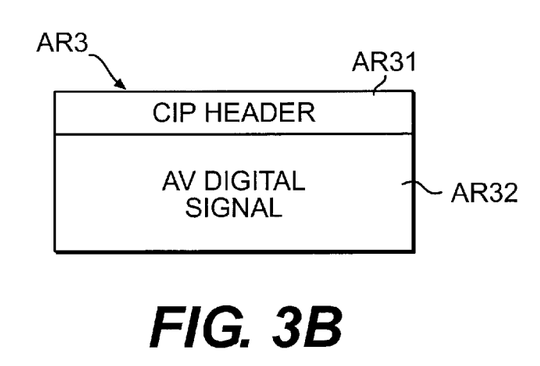
FIG. 3B shows a detailed configuration of a data area of the isochronous packet.

As shown in FIG. 3A, each isochronous packet comprises a packet header area AR1 for recording a plurality of packet headers, a header CRC area AR2 for recording error correcting codes for the packet headers, a data area AR3 for recording data, and a data CRC area AR4 for recording error correcting codes for the data. The packet header area AR1 comprises a data length area AR11 for recording information of a data length, a tag area AR12 for recording information of a tag, a channel area AR13 for recording information of a channel, a transaction code area AR14 for recording information of transaction codes, and a synthesizing signal area AR15 for recording information of a synthesizing signal. As shown in FIG. 3B, the data area AR3 comprises a CIP header area AR31 for recording a common isochronous packet (CIP) header and an AV data area AR32 for recording the AV digital signal transmitted from the VCR reproducing unit 11.

The CIP header of the area AR31 and the AV digital signal of the area AR32 denote a payload. The index code prepared by the index code preparing unit 14 is recorded in a predetermined position of the CIP header area AR31 or a predetermined position of the AV data area AR32.

The recording VCR 20 comprises:
- an isochronous packet receiving unit 21 for receiving the isochronous packet transmitted from the reproducing VCR 10 through the cable 30 one after another and performing a serial-parallel conversion for the isochronous packets;
- an isochronous packet detecting unit 22 for detecting attributes of each isochronous packet received by the isochronous packet receiving unit 21 according to the packet headers of the packet header area AR1 of the isochronous packet;
- an AV digital signal detecting unit 23 for detecting the AV digital signal recorded in the AV data area AR32 of the isochronous packet;
- a VCR recording unit 24 for recording the AV digital signal detected by the AV digital signal detecting unit 23 in a recording track of the second magnetic tape through a rotational head;
- an index code detecting unit 25 for checking the predetermined position of the CIP header area AR31 or the predetermined position of the AV data area AR32 in the isochronous packet, detecting the index code recorded in the predetermined position and outputting an index code detecting signal in cases where the index code is detected;
- a control pulse generating unit 26 for generating an analog control signal composed of a plurality of control pulses arranged in equal intervals, the analog control signal being set to the first duty ratio;
- a pulse duty ratio adjusting unit 27 for outputting the analog control signal received from the control pulse generating unit 26 without any pulse duty adjustment when any index code detecting signal is not received from the index code detecting unit 25, adjusting the first duty ratio of the analog control signal to the second duty ratio during an index signal period equivalent to a period of the particular group of control pulses when the index code detecting signal is received from the index code detecting unit 25; and
- a control pulse recording unit 28 for recording the control pulse received from the pulse duty ratio adjusting unit 27 in a control track of the second magnetic tape while supplying a time recording current corresponding the duty ratio of the control pulse to a control head 29.

A synchronizing signal indicating time information called a time stamp is arranged in the CIP header of the area AR31 of the isochronous packet, the time stamp is detected by the isochronous packet detecting unit 22, a head servo circuit (not shown) and a capstan servo circuit (not shown) arranged in the recording VCR 20 are actuated according to the time stamp to operate the recording VCR 20 in synchronization with the operation of the reproducing VCR 10.

In the above configuration, an operation of the information recording and reproducing apparatus 100 is described.

An AV digital signal (or a main information digital signal) relating to a visual signal and an audio signal is recorded in an inclined recording track of the first magnetic tape. Also, an analog control signal composed of a plurality of control pulses arranged in equal intervals is digitized to digital control data and is recorded in a control track of the first magnetic tape according to a predetermined recording method. A duty ratio of a particular group of control pulses recorded in a particular position corresponding to the leading position of the AV digital signal is set to a second duty ratio (for example, about 25%), and a duty ratio of the other control pulses is set to a first duty ratio (for example, about 55%).

Figure 4:
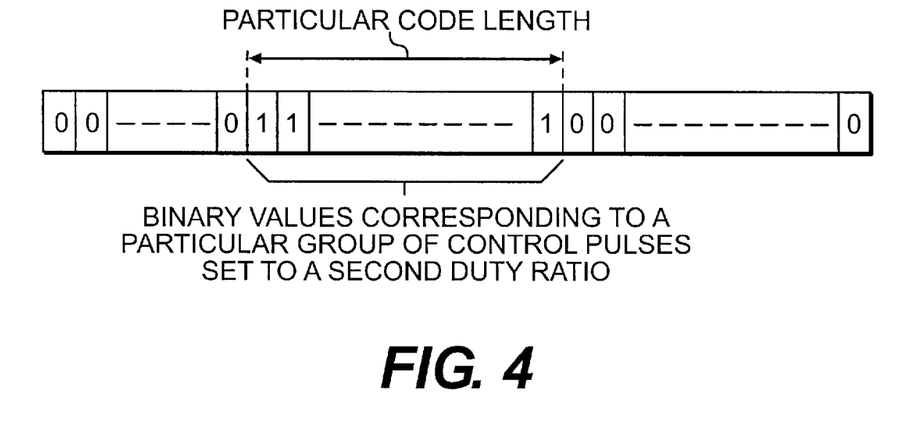
FIG. 4 shows a control signal expressed by binary digits.

As shown in FIG. 4, the other control pulses set to the first duty ratio are digitized to a series of binary digits "0", and the control pulses set to the second duty ratio are digitized to a series of binary digits "1". The particular group of control pulses set to the second duty ratio has a particular code length. For example, in cases where thirty control pulses are recorded as digital control data per second, the number of control pulses in the particular group set to the second duty ratio is set to sixty-one.

The AV digital signal is read out from the first magnetic tape through a rotational head and is reproduced and processed by the VCR reproducing unit 11. The AV digital signal is transmitted to the isochronous packet preparing unit 15. Also, the analog control signal is read out from the first magnetic tape through the control head 12 in synchronization with the reading of the AV digital signal, and the particular group of control pulses set to the second duty ratio is detected from the analog control signal as an identification signal such as an index signal in the index signal detecting unit 13, and an index signal detecting signal is output to the index code preparing unit 14.

Figure 5:
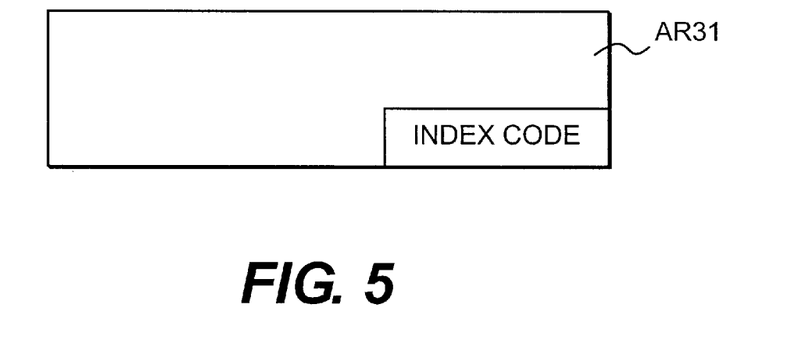
FIG. 5 shows an index code arranged in a predetermined portion of a CIP header area.

In the unit 14, when the index signal detecting signal is received, an identification code such as an index code is prepared and is transmitted to the isochronous packet preparing unit 15. That is, the analog index signal is converted into the digital index code in the units 13 and 14. In the unit 15, the AV digital signal is inserted into a data payload portion of an isochronous packet defined according to the IEEE 1394 standards, and the index code is inserted into a predetermined position of the data payload portion of the isochronous packet because the index code is digitized. As shown in FIG. 5, the index code is, for example, placed in a portion of the CIP header area AR31 of the isochronous packet. In this case, because the index code is arranged in the isochronous packet in synchronization with the AV digital signal, the index code indicates the leading position of the recorded AV digital signal.

Thereafter, a parallel-serial conversion is performed for the isochronous packets transmitted one after another to the isochronous packet transmitting unit 16, the isochronous packets are received in the isochronous packet receiving unit 21 through the cable 30, a serial-parallel conversion is performed for the isochronous packets, the packet headers of the packet header area AR1 of each isochronous packet is analyzed in the isochronous packet detecting unit 22, so that attributes of the isochronous packet are detected. Thereafter, the AV digital signal recorded in the AV data area AR32 of the isochronous packet is detected in the AV digital signal detecting unit 23, and the AV digital signal is recorded in a recording track of the second magnetic tape through a rotational head in the VCR recording unit 24.

Also, the isochronous packet is transmitted from the detecting unit 22 to the index code detecting unit 25, the predetermined position of the data payload portion of the isochronous packet, in which the index code is recorded, is checked. In cases where the index code is found out in the detecting unit 25, an index code detecting signal is transmitted to the pulse duty ratio adjusting unit 27. Also, an analog control signal, in which a plurality of control pulses arranged in equal intervals are set to the first duty ratio, is generated in the control pulse generating unit 26 according to the predetermined recording method in the same manner as that in the reproducing VCR 10, and the analog control signal set to the first duty ratio is transmitted to the adjusting unit 27.

Figure 6:
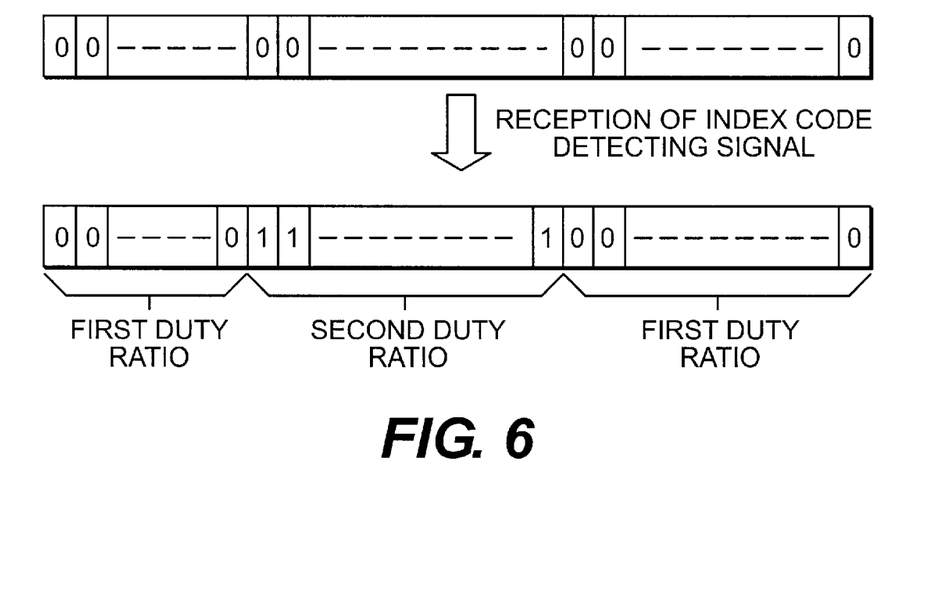
FIG. 6 shows the conversion of a particular group of control pulses expressed by binary digits "0" into a particular group of control pulses expressed by binary digits "1"

In the adjusting unit 27, as shown in FIG. 6, when the index code detecting signal is received, a specific group of control pulses of the analog control signal synchronized with the index code detecting signal is specified to make a specific code length of the specific group of control pulses equal to the particular code length of the particular group of control pulses of the analog control signal detected in the reproducing VCR 10, and the first duty ratio of the specific group of control pulses of the analog control signal is adjusted to the second duty ratio. The specific group of control pulses set to the second duty ratio is called an identification signal such as an index signal. Thereafter, the control pulses of the analog control signal having the analog index signal are transmitted to the control pulse recording unit 28 and are recorded as digital control data in a control track of the second magnetic tape through a control head 29 while supplying a time recording current corresponding the duty ratio of the control pulse to the control head 29. Therefore, the specific group of control pulses (or the index signal) corresponding to the leading position of the AV digital signal recorded in the second magnetic tape is recorded in the second magnetic tape on condition that the specific group of control pulses (or the index signal) is set to the second duty ratio (or a series of binary digits "1" in the digital expression) and the other control pulses are set to the first duty ratio (or a series of binary digits "0" in the digital expression).

Accordingly, the analog control signal indicating the leading position of the AV digital signal can be dubbed and recorded with the AV digital signal in the second magnetic tape.

Also, because the analog index signal detected in the reproducing VCR 10 is converted into the digital index code and the digital index code is inserted into the predetermined position of the data payload portion of the isochronous packet, the index code indicating the leading position of the AV digital signal can be transmitted with the AV digital signal to the recording VCR 20 through the cable 30. Therefore, any private line for the analog index signal is not required.

In this embodiment, the index signal representing the identification signal indicates the leading position of the AV digital signal to immediately detect the leading position of the AV digital signal and immediately reproduce the AV digital signal from its leading position. However, the present invention is not limited to the index signal indicating the leading position of the AV digital signal. For example, the present invention can be applied for the VHS address search system in which a time code or a binary coded decimal (BCD) code of four bits is recorded as address information.

Also, the identification signal represented by the index signal is recorded in a control track. However, the present invention is not limited to the identification signal recorded in a control track. For example, the present invention can be applied for a digital code recorded in an audio track such as a time code regulated according to the standards of the Society of Motion Picture and Television Engineers, Inc (SMPTE). In this case, a plurality of pulses indicating the time code regulated according to the SMPTE standards are not arranged at equal intervals, but the bi-phase mark modulation is performed for the pulses of the time code. However, because the pulses of the time code is recorded through a fixed head, so that the time code representing the identification signal can be applied in the present invention.

Also, the IEEE1394 standards are adopted as one serial interface. However, the present invention is not limited to the IEEE1394 standards.

(Second Embodiment)

Figure 7:
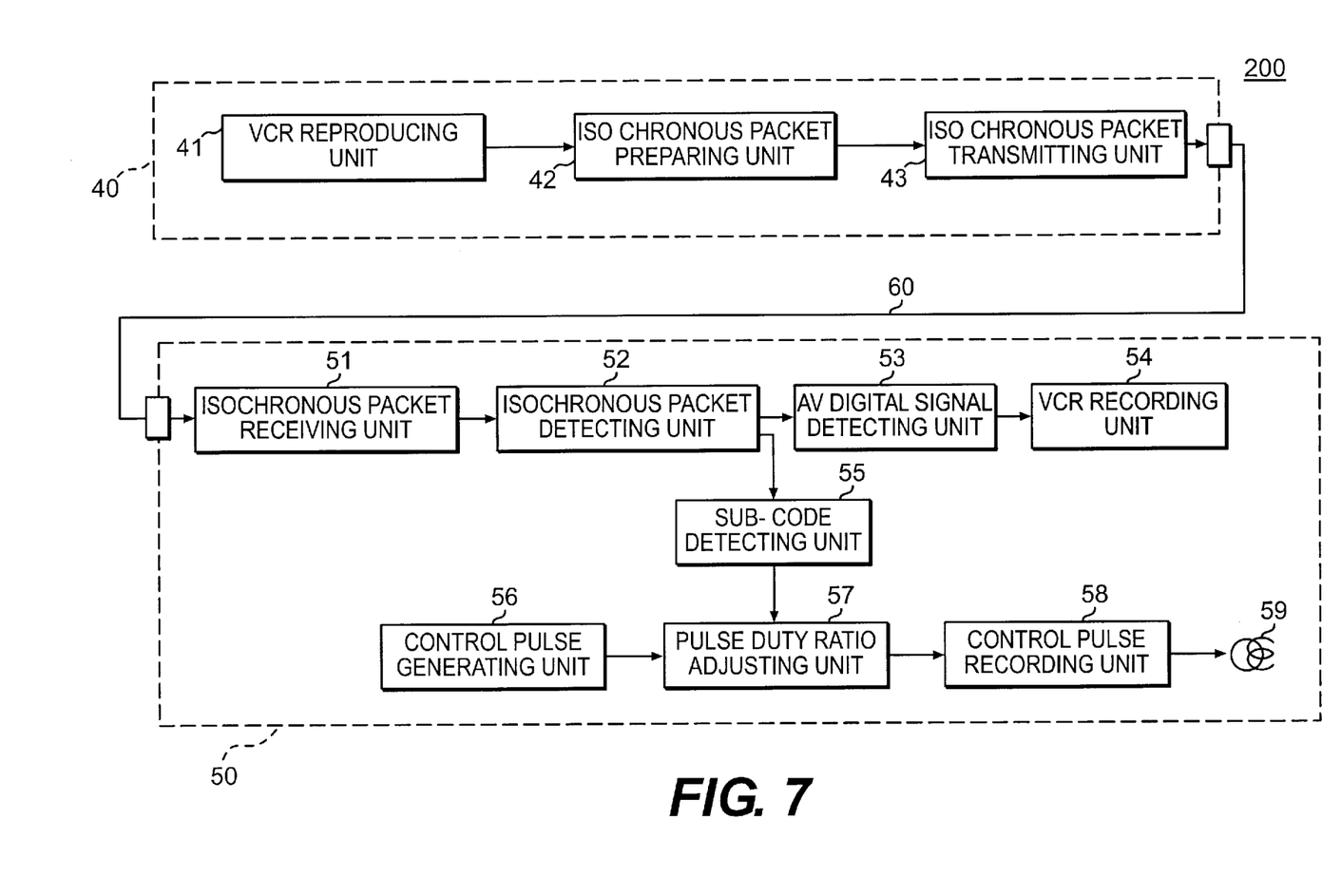
FIG. 7 is a block diagram of an information recording and reproducing apparatus according to a second embodiment of the present invention.

FIG. 7 is a block diagram of an information recording and reproducing apparatus according to a second embodiment of the present invention.

As shown in FIG. 7, an information recording and reproducing apparatus 200 comprises:

a digital reproducing VCR 40, functioning as a reproducing unit, for reproducing an AV digital signal (or a main information digital signal) and a sub-code digital signal recorded in the same inclined track of a first magnetic tape, packing the AV digital signal and the sub-code digital signal in an isochronous packet defined according to the IEEE 1394 standards and outputting the isochronous packet, the AV digital signal being obtained from a visual signal and an audio signal;

a recording VCR 50, functioning as a recording unit, for recording the AV digital signal of the isochronous packet output from the reproducing VCR 10 in a second magnetic tape through a rotational head and recording an analog identification signal reproduced by using the sub-code digital signal of the isochronous packet in the second magnetic tape through a fixed head; and a cable 60, having a real time transmission function according to the IEEE 1394 standards, for transmitting the isochronous packet output from the digital reproducing VCR 40 to the recording VCR 50 through a digital interface of the recording VCR 50.

As shown in FIG. 1, the sub-code digital signal is recorded in the sub-code area A3 of each inclined track of the first magnetic tape, and the AV digital signal is recorded in the main data area A7 of each inclined track of the first magnetic tape.

The digital reproducing VCR 40 comprises:

a VCR reproducing unit 41 for reproducing the AV digital signal and the sub-code digital signal recorded in each inclined track of the first magnetic tape through a rotational head (not shown) and processing the AV digital signal and the sub-code digital signal according to a conventional signal processing, a change of information indicated by the sub-code digital signal corresponding to a change of information indicated by the AV digital signal (for example, a leading position of the AV digital signal);

an isochronous packet preparing unit 42 for preparing an isochronous packet defined according to the IEEE 1394 standards, inserting the AV digital signal and the sub-code digital signal processed in the VCR reproducing unit 41 into a data payload portion of the isochronous packet; and an isochronous packet transmitting unit 43 for performing a parallel-serial conversion for the isochronous packets received one after another from the isochronous packet preparing unit 42 to arrange the isochronous packets in a format according to the IEEE 1394 standards and transmitting the isochronous packets to the cable 60.

The configuration of the isochronous packet prepared in the isochronous packet preparing unit 42 is shown in FIGS. 3A and 3B, and the AV digital signal and the sub-code digital signal are arranged in the AV data area AR32.

The recording VCR 50 comprises:

an isochronous packet receiving unit 51 for receiving the isochronous packets transmitted from the digital reproducing VCR 40 through the cable 60 one after another and performing a serial-parallel conversion for the isochronous packets;

an isochronous packet detecting unit 52 for detecting attributes of each isochronous packet received by the isochronous packet receiving unit 51 according to the packet headers of the packet header area AR1 of the isochronous packet;

an AV digital signal detecting unit 53 for detecting the AV digital signal recorded in the data payload portion (or the AV data area AR32) of the isochronous packet;

a VCR recording unit 54 for recording the AV digital signal detected by the AV digital signal detecting unit 53 in a recording track of the second magnetic tape through a rotational head;

a sub-code detecting unit 55 for extracting the sub-code digital signal from the data payload portion (or the AV data area AR32) of the isochronous packet, analyzing header data of the sub-code digital signal, detecting a change of information indicated by the AV digital signal (or a leading position of the AV digital signal) according to a change of information indicated by the sub-code digital signal, which is indicated by the header data of the sub-code digital signal, and outputting a pulse duty ratio change instructing signal in synchronization with the change of information indicated by the AV digital signal (or the leading position of the AV digital signal);

a control pulse generating unit 56 for generating an analog control signal composed of a plurality of control pulses arranged in equal intervals, the analog control signal representing an analog auxiliary signal, and the analog control signal being set to a first duty ratio (or an ordinary duty ratio);

a pulse duty ratio adjusting unit 57 for outputting the analog control signal received from the control pulse generating unit 56 without any pulse duty adjustment when any pulse duty ratio change instructing signal is not received from the index code detecting unit 55, specifying a particular group of control pulses of the analog control signal corresponding to the change of information indicated by the AV digital signal (or the leading position of the AV digital signal) when the pulse duty ratio change instructing signal is received from the sub-code detecting unit 55, and adjusting the first duty ratio of the particular group of control pulses to a second duty ratio (or a specific duty ratio), the particular group of control pulses set to the second duty ratio representing an analog identification signal; and a control pulse recording unit 58 for recording the control pulse received from the pulse duty ratio adjusting unit 57 in a control track of the second magnetic tape in synchronization with the recording of the AV digital signal while supplying a time recording current corresponding the duty ratio of the control pulse to a control head 59.

A synchronizing signal indicating time information called a time stamp is arranged in the CIP header of the area AR31 of the isochronous packet, the time stamp is detected by the isochronous packet detecting unit 52, a head servo circuit (not shown) and a capstan servo circuit (not shown) arranged in the recording VCR 50 are actuated according to the time stamp to operate the recording VCR 50 in synchronization with the operation of the digital reproducing VCR 40.

In the above configuration, an operation of the information recording and reproducing apparatus 200 is described.

One AV digital signal (or one main information digital signal) recorded in the main data area A7 of each inclined track of the first magnetic tape and one sub-code digital signal recorded in the sub-code area A3 of each inclined track of the first magnetic tape are read out through a rotational head and is reproduced in the VCR reproducing unit 41. The sub-code digital signal indicates a changing position of contents of the AV digital signal. For example, a scene change position of the AV digital signal is indicated by a changing position of an AV digital signal recording data or a recording start position of the AV digital signal indicated by the subcode digital signal. Therefore, a leading position of the AV digital signal can be indicated by the sub-code digital signal.

Thereafter, the AV digital signal and the sub-code digital signal are packed in a data payload portion of an isochronous packet. The data payload portion is the data area AR3, and the AV digital signal and the sub-code digital signal are, for example, recorded in the AV data area AR32 of the isochronous packet. Thereafter, a parallel-serial conversion is performed for the isochronous packets received one after another in the isochronous packet transmitting unit 43, and the isochronous packets are transmitted to the isochronous packet receiving unit 51 of the recording VCR 50 through the cable 60.

In the recording VCR 50, the packet headers of the packet header area AR1 of each isochronous packet are analyzed in the isochronous packet detecting unit 52, and attributes of the isochronous packet are detected. Thereafter, the AV digital signal arranged in the AV data area AR32 of the isochronous packet is detected in the detecting unit 53 and is recorded by the recording unit 54 in a recording track of the second magnetic tape through a rotational head.

Also, the sub-code digital signal is extracted from the AV data area AR32 of the isochronous packet in the sub-code detecting unit 55, a leading position of the AV digital signal is detected according to contents of the header data of the sub-code digital signal, and a pulse duty ratio change instructing signal is output to the adjusting unit 57 in synchronization with the leading position of the AV digital signal. In the adjusting unit 57, the first duty ratio of a particular group of control pulses of the analog control signal to a second duty ratio when the pulse duty ratio change instructing signal is received from the sub-code detecting unit 55. Thereafter, the analog control signal is recorded in a control track of a second magnetic tape by the recording means 58 in synchronization with the recording of the AV digital signal on condition that the particular group of control pulses corresponds to the leading position of the AV digital signal recorded in the second magnetic tape.

Accordingly, even though the sub-code digital signal is not recorded with the AV digital signal in the second magnetic tape by the recording VCR 50, because a duty ratio of a particular group of control pulses corresponding to a leading position of the AV digital signal is changed according to the sub-code digital signal and the control signal is recorded in the second magnetic tape, information indicated by the subcode digital signal can be recorded in the second magnetic tape. Therefore, the AV digital signal and the sub-code digital signal recorded in the first magnetic tape can be substantially dubbed in the second magnetic tape.

Also, because any analog circuit for reading out a control signal from the first magnetic tape and processing the control signal is not required for the reproducing VCR 40, a conventional reproducing VCR can be used as the reproducing VCR 40. Therefore, the information recording and reproducing apparatus 200 can be manufactured at a low cost.

Also, because known analog circuits can be used as the control pulse generating unit 56, the pulse duty ratio adjusting unit 57 and the control pulse recording unit 58, the information recording and reproducing apparatus 200 can be manufactured at a low cost.

In this embodiment, the sub-code digital signal indicates the leading position of the AV digital signal to immediately detect the leading position of the AV digital signal and immediately reproduce the AV digital signal from its leading position. However, the present invention is not limited to the sub-code digital signal indicating the leading position of the AV digital signal. For example, the present invention can be applied for the VHS address search system in which a time code or a binary coded decimal (BCD) code of four bits is recorded as address information.

Also, the control signal is recorded in a control track. However, the present invention is not limited to the control signal recorded in a control track. For example, the present invention can be applied for a digital code recorded in an audio track such as a time code regulated according to the standards of the Society of Motion Picture and Television Engineers, Inc (SMPTE). In this case, a plurality of pulses indicating the time code regulated according to the SMPTE standards are not arranged at equal intervals, but the biphase mark modulation is performed for the pulses of the time code. However, because the pulses of the time code is recorded through a fixed head, so that the time code can be applied in the present invention.

Also, the present invention is not limited to the digital reproducing VCR 40. That is, any reproducing apparatus, in which the sub-code digital signal is reproduced with the AV digital signal, can be used. For example, an optical disk reproducing apparatus can be applied for the present invention.

Also, the IEEE1394 standards are adopted as one serial interface. However, the present invention is not limited to the IEEE1394 standards.

Having illustrated and described the principles of the present invention in a preferred embodiment thereof, it should be readily apparent to those skilled in the art that the invention can be modified in arrangement and detail without departing from such principles we claim all modifications coming within the scope of the accompanying claims:

What is claimed is:

1. An information recording and reproducing apparatus, in which a main digital information signal recorded in a first track of a first recording medium and an auxiliary signal recorded in a second track of the first recording medium are reproduced in a reproducing apparatus and the main digital information signal and the auxiliary signal reproduced by the reproducing apparatus are dubbed and recorded in a second recording medium in a recording apparatus, the reproducing apparatus comprising:

main information signal reproducing means for reproducing the main digital information signal recorded in the first track of the first recording medium;

auxiliary signal reproducing means for reproducing the auxiliary signal recorded in the second track of the first recording medium in synchronization with the reproduction of the main digital information signal in the main information signal reproducing means, the auxiliary signal being composed of a plurality of pulses arranged in series, a particular group of pulses in the auxiliary signal being set to a special duty ratio, and the other pulses of the auxiliary signal being set to an ordinary duty ratio;

identification signal detecting means for detecting the particular group of pulses as an analog identification signal from the auxiliary signal reproduced by the auxiliary signal reproducing means;

identification code preparing means for preparing an identification code corresponding to the analog identification signal in cases where the analog identification signal is detected by the identification signal detecting means; and packet preparing means for preparing a packet defined according to a prescribed serial interface to arrange the main digital information signal reproduced by the main information signal reproducing means and the identification code reproduced by the auxiliary signal reproducing means in the packet, and the recording apparatus comprising:

packet detecting means for detecting the packet transmitted from the packet preparing means;

main information signal detecting means for detecting the main digital information signal from the packet detected by the packet detecting means;

main information signal recording means for recording the main digital information signal detected by the main information signal detecting means in a first track of the second recording medium;

identification code detecting means for detecting the identification code from the packet detected by the packet detecting means;

auxiliary signal generating means for generating a recording auxiliary signal composed of a plurality of recording pulses arranged in series, the recording pulses being set to a recording ordinary duty ratio;

pulse duty ratio adjusting means for detecting a particular group of recording pulses, in synchronization with the detection of the identification code in the identification code detecting means, from the recording auxiliary signal generated by the auxiliary signal generating means, and adjusting the recording ordinary duty ratio of the particular group of recording pulses to a recording specific duty ratio; and auxiliary signal recording means for recording the auxiliary signal, in which the particular group of recording pulses is set to the recording specific duty ratio by the pulse duty ratio adjusting means, in a second track of the second recording medium in synchronization with the recording of the main digital information signal in the main information signal recording means.

2. An information recording and reproducing apparatus according to claim 1, further comprising:

a packet transmission line for transmitting the packet prepared by the packet preparing means of the reproducing apparatus to the packet detecting means of the recording apparatus.

3. An information recording and reproducing apparatus according to claim 1 in which the main digital information signal recorded in the first track of the first recording medium is an audio-visual digital signal indicating an audio signal and a visual signal and the auxiliary signal recorded in the second track of the first recording medium is a control signal, the analog identification signal of the control signal indicating a leading position of the audio-visual digital signal, the audio-visual digital signal being read out from the first recording medium through a rotational head and being recorded in the second recording medium through another rotational head, and the control signal being read out from the first recording medium through a fixed head and being recorded in the second recording medium through another fixed head.

4. An information recording and reproducing apparatus according to claim 1 in which the auxiliary signal is a time code in which a bi-phase mark modulation is performed for a plurality of pulses, the time code being read out from an audio track of the first recording medium through a fixed head and being recorded in an audio track of the second recording medium through another fixed head.

5. An information recording and reproducing apparatus according to claim 1 in which the packet prepared by the packet preparing means is an isochronous packet defined according to IEEE 1394 standards as the prescribed serial interface, and the main digital information signal and the identification code are inserted into a data payload portion of the isochronous packet.

6. An information recording and reproducing apparatus according to claim 5 in which the identification code is inserted into a header area or a data area of the data payload portion of the isochronous packet.

7. An information recording and reproducing method, comprising the steps of:

reproducing a main digital information signal and a sub-code signal recorded in a first track of a first recording medium, a change of information indicated by the sub-code signal indicating a change of information indicated by the main digital information signal;

preparing a packet defined according to a prescribed serial interface to arrange the main digital information signal and the sub-code signal in the packet;

transmitting the packet through a packet transmitting line;

detecting the packet transmitted through the packet transmitting line;

detecting the main digital information signal from the packet;

detecting the sub-code signal from the packet;

detecting the change of the information indicated by the sub-code signal;

preparing an analog identification signal when the change of the information indicated by the sub-code signal is detected;

recording the main digital information signal in a first track of a second recording medium; and recording the analog identification signal in a second track of the second recording medium to make the analog identification signal correspond to the change of information indicated by the main digital information signal.

8. An information recording and reproducing method according to claim 7 in which the step of preparing an analog identification signal comprises the steps of:

generating an auxiliary signal composed of a plurality of pulses arranged in series, the pulses being set to an ordinary duty ratio;

detecting a particular group of pulses synchronized with the change of the information of the sub-code signal from the auxiliary signal; and adjusting the ordinary duty ratio of the particular group of pulses to a specific duty ratio, the particular group of pulses set to the specific duty ratio being the analog identification signal.

9. An information recording apparatus, comprising:

input means for receiving a packet defined according to a prescribed serial interface, a main digital information signal and a sub-code signal being inserted respectively to a payload portion of the packet;

sub-code signal detecting means for detecting a change of information of the sub-code extracted from the packet input to the input means;

control pulse generating means for generating control pulses in equal intervals having a first duty ratio;

pulse duty ratio adjusting means for outputting the control pulses maintaining the first duty ratio without modification when the pulse duty ratio adjusting means receives no signal from the sub-code signal detecting means, and for outputting an index signal having a second duty ratio by modifying the first duty ratio of the control pulses into the second duty ratio when the pulse duty ratio adjusting means receives a detecting signal from the sub-code signal detecting means, and recording means for recording the main digital information□signal on a magnetic tape and for recording the index signal on a predetermined portion of the magnetic tape.

10. An information recording and reproducing apparatus, comprising:

main information signal reproducing means for reproducing a main digital information signal and a sub-code signal recorded in a first track of a first recording medium, preparing a packet defined according to a prescribed serial interface to arrange the main digital information signal and the sub-code signal in the packet, information indicated by the sub-code signal indicating a change of information indicated by the main digital information signal;

a packet transmitting line for transmitting the packet in which the main digital information signal and the sub-code signal are arranged by the main information signal reproducing means;

packet detecting means for detecting the packet transmitted from the main information signal reproducing means through the packet transmitting line;

main information signal detecting means for detecting the main digital information signal from the packet detected by the packet detecting means, main information signal recording means for recording the main digital information signal detected by the main information signal detecting means in a first track of a second recording medium;

sub-code signal detecting means for detecting the sub-code signal from the packet detected by the packet detecting means and detecting the information indicated by the sub-code signal;

auxiliary signal preparing means for preparing an analog auxiliary signal in which the information of the sub-code signal detected by the sub-code signal detecting means is included;

auxiliary signal recording means for recording the analog auxiliary signal prepared by the auxiliary signal preparing means in a second track of the second recording medium;

wherein a change of the information of the sub-code signal indicates the change of the information of the main digital information signal, the change of the information of the sub-code signal is detected by the sub-code signal detecting means, and wherein the auxiliary signal preparing means comprises:

auxiliary signal generating means for generating an auxiliary signal composed of a plurality of pulses arranged in series, the pulses being set to an ordinary duty ratio; and pulse duty ratio adjusting means for detecting a particular group of pulses, which is synchronized with the change of the information of the sub-code signal detected by the subcode signal detecting means, from the auxiliary signal generated by the auxiliary signal generating means, and adjusting the ordinary duty ratio of the particular group of pulses to a specific duty ratio, and the analog auxiliary signal is recorded in the second recording medium by the auxiliary signal recording means to make the particular group of pulses of the auxiliary signal correspond to the change of the information of the main digital information signal recorded in the first track of the second recording medium.

* * * * *